Figure 1:
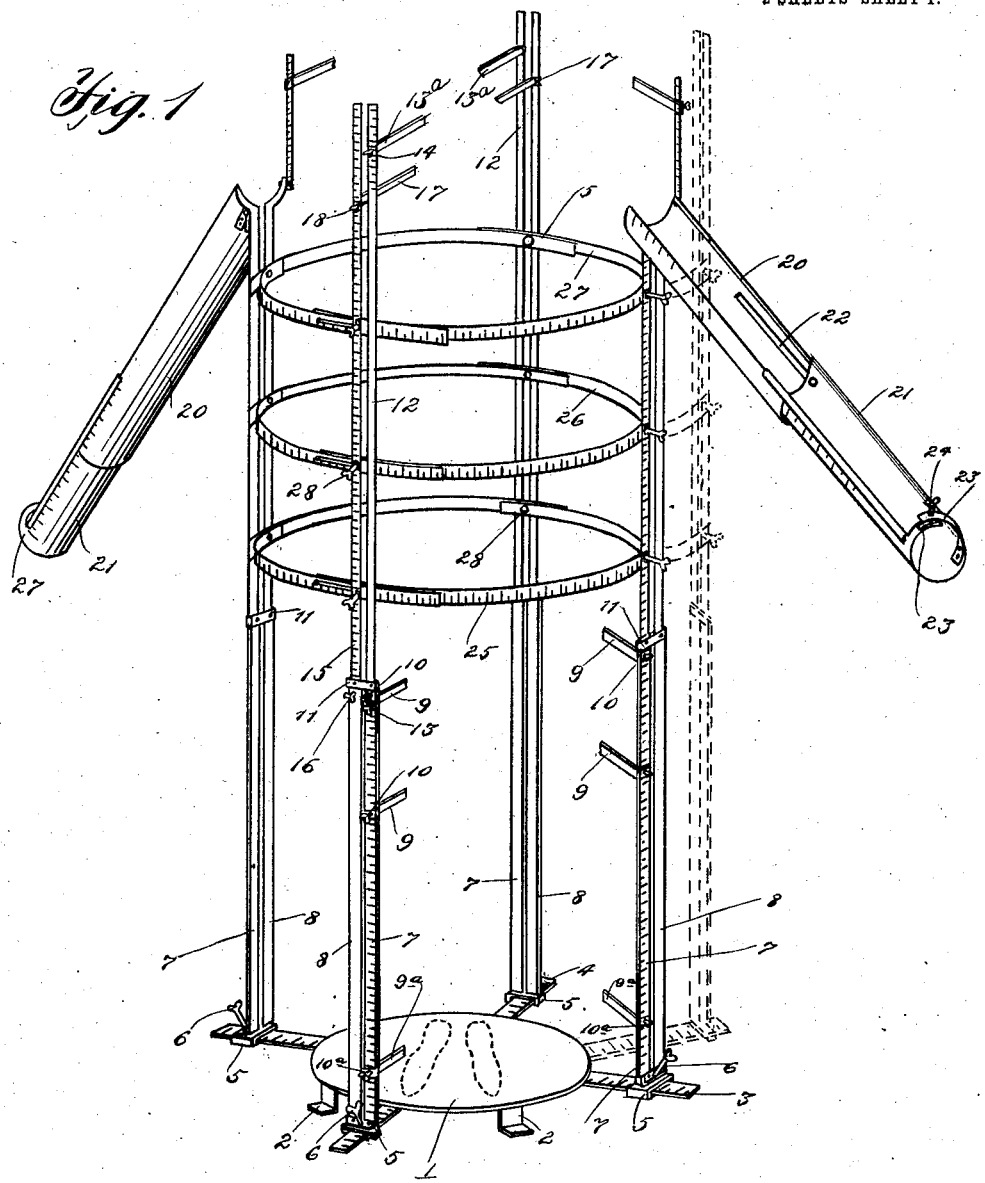

A. LUONGO.
TAILOR'S MEASURING INSTRUMENT.
APPLICATION FILED JAN. 22, 1910.

1,009,427.

Patented Nov. 21, 1911.

2 SHEETS—SHEET 1.

Witnesses
N. Abramson
Lila M. Gillespie

Inventor
Aniello Luongo
By Alx. J. Wedderburn Jr.
Attorney

A. LUONGO.
TAILOR'S MEASURING INSTRUMENT.
APPLICATION FILED JAN. 22, 1910.
1,009,427.
Patented Nov. 21, 1911.
2 SHEETS—SHEET 2.
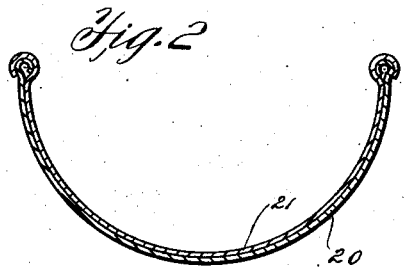
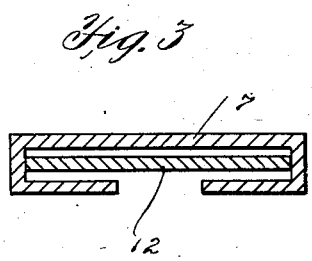
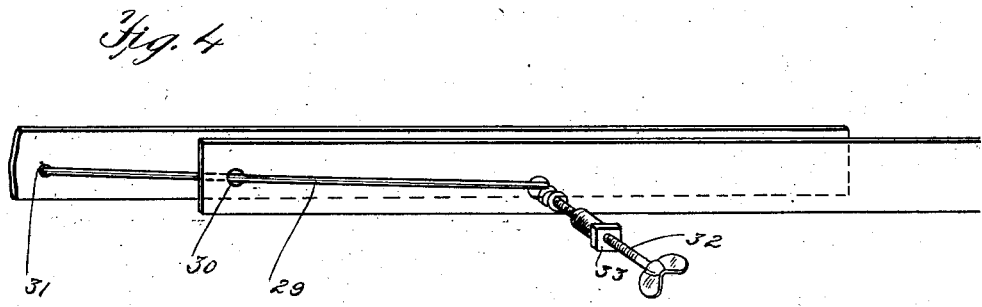
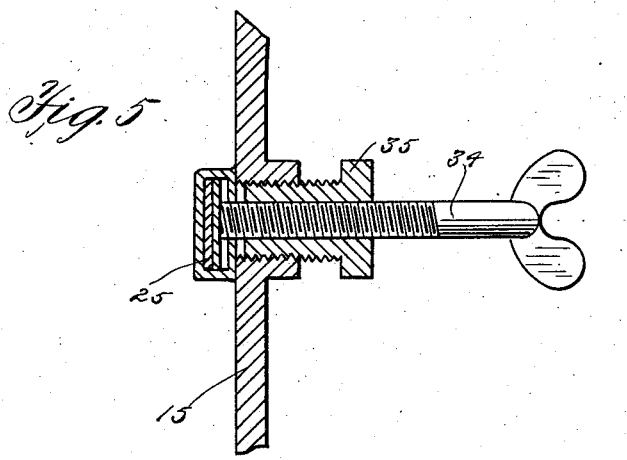
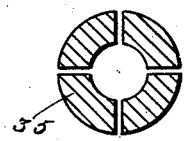

UNITED STATES PATENT OFFICE.

ANIELLO LUONGO, OF NEW YORK, N. Y.

TAILOR'S MEASURING INSTRUMENT.

1,009,427. Specification of Letters Patent. Patented Nov. 21, 1911.

Application filed January 22, 1910. Serial No. 539,570.

*To all whom it may concern:*

Be it known that I, ANIELLO LUONGO, residing at New York, in the county of New York and State of New York, have invented certain new and useful Improvements in Tailors' Measuring Instruments, of which the following is a specification.

This invention relates to tailors' measureing instruments and is designed to provide improved means whereby complete measurements of a person can be quickly taken.

One of the objects of the invention is the construction of a device having vertically adjustable body-encircling-bands adapted to measure different portions of a person's body and vertically adjustable standards adapted to measure various heights, and means adapted to measure the arms of a person.

With the above and other objects in view the invention comprises certain combinations, constructions and arrangements of parts, clearly illustrated in the accompanying drawings, in which, Figure 1 is a perspective view of the complete device ready for use, Fig. 2 is a transverse sectional view of an arm holding and measuring member, Fig. 3 is a cross sectional view of a standard, Fig. 4 is a detail perspective view of a band showing the means for adjusting the same, Fig. 5 is a detail sectional view of a clamping device, and Fig. 6 is a detail sectional view of the lock nut thereof.

Referring to the accompanying drawings illustrating the invention 1 denotes a platform adapted to support a person. This platform is provided with legs 2 adapted to hold the same slightly above a floor. Below the platform two crossed rods or measuring sticks 3 and 4 are arranged, each of which is provided with graduations. On the outer ends of the graduated sticks or rods 3 and 4 slidable clamping members 5 are arranged, each of which is provided with screws 6 adapted to hold vertically disposed standards 7 and 8 thereon, and to further hold the standards 7 and 8 in fixed position on the ends of the cross members or rods 3 and 4. The standards 7 are graduated while the standards 8 are not. Two of the former carry arms 9 adjustably secured in place by screws 10, and adapted to measure the length of a garment from the ankle or knee. The upper ends of the two standards are connected to each other by means of tie members 11. The standards 7 and 8 are spaced apart from each other and each is adapted to carry members slidably secured thereto. To the standards 7 sticks or rods 12 are slidably secured by means of screws 13, and said sticks are graduated on their upper ends and are further provided with lateral arms 13$^a$ secured by screws 14. To two of the standards 8 graduated sticks 15 are adjustably secured by means of screws 16, and each of said sticks carries a lateral arm 17 adapted to measure the height of the shoulder seam secured in place by screws 18. On the lower ends of the standards 7 arms 9$^a$ are secured by means of screws 10$^a$.

The device is provided with eight standards arranged in groups of two equal distances apart. On a part of the sticks slidable on the standards 7 and 8 arm measuring devices are arranged. These devices consist of angularly supported semitubular members 20, on the lower ends of which members 21 are slidably secured by a screw tightened wire 22. The lower ends of the members are graduated and are further provided with curved overlapping arms 23 adjustably secured to each other by screws 24. These arms are provided for the purpose of measuring the wrists of a person's arms, while the members 21 are made adjustable on the members 20 in order that the length of arms can be measured.

Three adjustable bands 25, 26 and 27 adapted to measure the hips, waist and chest, are secured to the standard supported sticks 12 and 15 by means of screws 28. Each band is made in three sections, the ends of which overlap each other. The bands are contracted by means of a wire 29, which is passed through an opening 30 in one of the band sections and is secured at 31 to an adjacent band section. This wire is tightened by means of a winged screw 32, which carries a lock or binding nut 33 adapted to be clamped against the wire after being tightened.

In order to allow for the entrance of a person into the device so that the bands can be placed around him one set of the standards 7 and 8 is arranged to swing outwardly of the rest, and the bands are so connected to said swinging standard that an opening for a person can be effected in to the device. This connection is controlled by means of a screw 34 which operates in a slit lock nut 35, screwed into one of the sticks 15. By adjusting the different bands and the different sticks and arms carried by the standards various measurements of a person can be taken.

Having described my invention I claim:—

1. A measuring device comprising a platform, horizontal scaled projections thereon, rigid scaled standards on said projections, said standards being slidable on said projections, said standards having rigid telescopic scaled extensions.

2. A measuring device comprising a platform, horizontal scaled projections thereon, rigid scaled standards on said projections, said standards being slidable on said projections, said standards having rigid telescopic scaled extensions, said platform having a pivoted projection carrying a telescopic standard.

3. A measuring device comprising a platform, horizontal scaled projections thereon, rigid scaled standards on said projections, said standards being slidable on said projections, said standards having rigid telescopic scaled extensions, said platform having a pivoted projection carrying a telescopic standard, flexible circular bands carried by said telescopic extensions.

4. A measuring device comprising a platform, horizontal scaled projections thereon, rigid scaled standards on said projections, said standards being slidable on said projections, said standards having rigid telescopic scaled extensions, said platform having a pivoted projection carrying a telescopic standard, flexible circular bands carried by said telescopic extensions, said bands being vertically adjustable on said extensions.

5. A measuring device comprising a platform, horizontal scaled projections thereon, rigid scaled standards on said projections, said standards being slidable on said projections, said standards having rigid telescopic scaled extensions, said platform having a pivoted projection carrying a telescopic standard, flexible circular bands carried by said telescopic extensions, said bands being vertically adjustable on said extensions, means for horizontally adjusting said bands whereby they may be retained in said adjusted position.

6. A measuring device comprising a platform, horizontal scaled projections thereon, rigid scaled standards on said projections, said standards being slidable on said projections, said standards having rigid telescopic scaled extensions, said platform having a pivoted projection carrying a telescopic standard, flexible circular bands carried by said telescopic extensions, said bands being vertically adjustable on said extensions, means for horizontally adjusting said bands whereby they may be retained in said adjustable position, said means consisting of a turn screw on one end of said bands and a flexible member on another end of said band, connected to said screw and adapted to be wound thereon.

7. A measuring device comprising a platform, horizontal scaled projections thereon, rigid scaled standards on said projections, said standards being slidable on said projections, said standards having rigid telescopic scaled extensions, said platform having a pivoted projection carrying a telescopic standard, flexible circular bands carried by said telescopic extensions, said bands being vertically adjustable on said extensions, means for horizontally adjusting said bands whereby they may be retained in said adjusted position, said means consisting of a turn screw in one end of said bands and a flexible member on another end of said band connected to said screw and adapted to be wound thereon.

8. A measuring device comprising a platform, horizontal scaled projections thereon, rigid scaled standards on said projections, said standards being slidable on said projections, said standards having rigid telescopic scaled projections, said platform having a pivoted projection carrying a telescopic standard, flexible circular bands carried by said telescopic extensions, said bands being vertically adjustable on said extensions, means for horizontally adjusting said bands whereby they may be retained in said adjusted position, said means consisting of a turn screw in one end of said bands and a flexible member on another end of said band connected to said screw and adapted to be wound thereon, said slidable projections being adjustable, and means for binding said projections in a fixed position.

9. A measuring device comprising a platform, horizontal scaled projections thereon, rigid scaled standards on said projections, said standards being slidable on said projections, said standards having rigid telescopic scaled projections, said platform having a pivoted projection carrying a telescopic standard, flexible circular bands carried by said telescopic extensions, said bands being vertically adjustable on said extensions, means for horizontally adjusting said bands whereby they may be retained in said adjusted position, said means consisting of a turn screw in one end of said bands and a flexible member on another end of said band connected to said screw and adapted to be wound thereon, said slidable projections being adjustable and means for binding said projections in a fixed position, telescopic sleeve measurers on two of said extensions.

In testimony whereof I affix my signature, in presence of two witnesses.

ANIELLO LUONGO.

Witnesses:
FILIPPO H. DEZ,
LUIGI BOTTIGHÉRI.

Copies of this patent may be obtained for five cents each, by addressing the "Commissioner of Patents, Washington, D. C."